United States Patent [19]

Colle et al.

[11] Patent Number: 5,491,269
[45] Date of Patent: Feb. 13, 1996

[54] METHOD FOR INHIBITING HYDRATE FORMATION

[75] Inventors: Karla S. Colle; Russell H. Oelfke, both of Houston, Tex.

[73] Assignee: Exxon Production Research Company, Houston, Tex.

[21] Appl. No.: 306,331

[22] Filed: Sep. 15, 1994

[51] Int. Cl.$^6$ .................................. C07C 7/20; F17D 1/05
[52] U.S. Cl. .................................. 585/15; 137/3; 137/13; 166/310; 166/371; 585/950
[58] Field of Search ..................... 585/15, 950; 166/310, 166/371; 137/3, 13

[56] References Cited

U.S. PATENT DOCUMENTS

| | | | |
|---|---|---|---|
| 3,741,961 | 6/1973 | Kmiecik et al. | 260/243 R |
| 4,203,900 | 5/1980 | Kaiser | 548/239 |
| 4,354,029 | 10/1982 | Kaiser et al. | 548/239 |
| 4,856,593 | 8/1989 | Matthews et al. | 106/310 |
| 4,915,176 | 4/1990 | Sugier et al. | 166/371 |
| 4,973,775 | 11/1990 | Sugier et al. | 585/15 |
| 5,076,364 | 12/1991 | Hale et al. | 166/310 |
| 5,076,373 | 12/1991 | Hale et al. | 175/40 |
| 5,244,878 | 9/1993 | Sugier et al. | 507/90 |
| 5,331,105 | 7/1994 | Duncum et al. | 585/800 |
| 5,420,370 | 5/1995 | Sloan, Jr. | 585/15 |
| 5,432,292 | 7/1995 | Sloan, Jr. | 585/15 |

FOREIGN PATENT DOCUMENTS

| | | |
|---|---|---|
| 0309210A1 | 3/1989 | European Pat. Off. . |
| 0336501A2 | 10/1989 | European Pat. Off. . |
| 0457375A1 | 11/1991 | European Pat. Off. . |
| 0536950A1 | 4/1993 | European Pat. Off. . |
| 0582507A1 | 2/1994 | European Pat. Off. . |
| 0594479A1 | 4/1994 | European Pat. Off. . |
| 2618876 | 2/1989 | France . |
| 1391692 | 4/1988 | U.S.S.R. . |
| 1683807A1 | 10/1991 | U.S.S.R. . |
| 1799286A3 | 2/1993 | U.S.S.R. . |
| PCT/EP3/01519 | 12/1993 | WIPO . |
| PCT/US93/11191 | 6/1994 | WIPO . |

OTHER PUBLICATIONS

U.S. patent application Ser. No. 07/979,588 by E. D. Sloan, Jr., filed Nov. 20, 1992.
U.S. CIP patent application Ser. No. 08/083,108 by E. D. Sloan, Jr., filed Jun. 24, 1993.
"Recent Syntheses and Reactions of Cyclic Imidic Esters," Seeliger et al., *Angew. Chem. Int. Ed.*, vol. 5, No. 10, 875–88 (1966).
"Block Copolymers from Cyclic Imino Ethers: A New Class of Nonionic Polymer Surfactant," Kobayashi et al., *Macromolecules*, vol. 19, p. 535, (1986).
"Influence of the Formation of Crystal Hydrates of Liquids and Gases," Krasnov, Source Not Supplied, No. 81094.4, UDC 622.324.5:661.181.1.002.614, Publication Date Unknown.
"Effect of Surfactants on Hydrate Formation Kinetics," Kalogerakis et al. SPE 1993 International Oilfield Chemistry Symposium (new Orleans, Mar. 2–May 1993) Proceedings 375–83 (1993).
"Surfactants in Oil Production," Muijs, R. Soc. Chem., (Chemical Oil Ind. Developments & Applications) V 97, 277–97, 1991.
"A Molecular Mechanism for Gas Hydrate Nucleation from Ice," Sloan, et al. AIChE Journal, vol. 37, No. 9, 1281–92, (Sep. 1991).
"Surfactants Studies as Hydrate–Formation Inhibitors," Kuliev et al., Gazovoe Delo (1972), (10), 17–19. (Translation enclosed).
"Effect of Lower Alcohols on Formation of Crystallohydrates of Liquids and Gases," Krasnov, Gazovoe Delo (1966), (12), 9–11 (Translation enclosed).
"Clathrate Hydrates," P. Englezos, Ind. Eng. Chem. Res. 1993, 32, 1251–1274.
"Recent Developments in Gas Dehydration and Hydrate Inhibition," Hubbard et al., SPE 21507, pp. 263–276 (1991).
"Natural Gas Hydrate Phase Equilibria and Kinetics: Understanding the State of The Art," Sloan, Revue de l'Institut Francais du Petrole, (continued) vol. 45, No. 2, Mars–Avril 1990. Presented Jun. 8, 1989.

*Primary Examiner*—Asok Pal
*Attorney, Agent, or Firm*—K. D. Van Tassel

[57] ABSTRACT

A method for inhibiting the formation of clathrate hydrates in a fluid having hydrate forming constituents is disclosed. More specifically, the method can be used in treating a petroleum fluid stream such as natural gas conveyed in a pipe to inhibit the formation of a hydrate restriction in the pipe. The hydrate inhibitors used for practicing the method are substantially water soluble polymers formed from a cyclic imino ether. Some examples of such inhibitors include various N-acyl polyalkyleneimines, such as N-acyl substituted polyethyleneimine, N-acyl substituted polypropyleneimine, N-acyl substituted polybutyleneimine, N-acyl substituted polypentyleneimine and copolymers thereof. Also, such N-acyl substituted polyalkyleneimines can be used in various ratios with other substantially water soluble polymers and copolymers. Preferably, a solvent such as water, brine, alcohol, or mixtures thereof is used to produce an inhibitor solution or mixture to facilitate treatment of the petroleum fluid stream.

10 Claims, No Drawings

METHOD FOR INHIBITING HYDRATE FORMATION

Related to copending U.S. patent application, Ser. No. 08/306,568, filed in the name of K. S. Colle et al. on Sep. 15, 1994.

FIELD OF THE INVENTION

The present invention relates to a method for inhibiting the formation of clathrate hydrates in a fluid. More specifically, the invention relates to a method for inhibiting the formation of gas hydrates in a pipe used to convey oil or gas.

BACKGROUND OF THE INVENTION

Carbon dioxide, hydrogen sulfide, and various hydrocarbons, such as methane, ethane, propane, normal butane and isobutane, are present in natural gas and other petroleum fluids. However, water is typically found mixed in varying amounts with such petroleum fluid constituents. Under conditions of elevated pressure and reduced temperature clathrate hydrates can form when such petroleum fluid constituents or other hydrate formers are mixed with water. Clathrate hydrates are water crystals which form a cage-like structure around guest molecules such as hydrate forming hydrocarbons or gases. Some hydrate forming hydrocarbons include, but are not limited to, methane, ethane, propane, isobutane, butane, neopentane, ethylene, propylene, isobutylene, cyclopropane, cyclobutane, cyclopentane, cyclohexane, and benzene. Some hydrate forming gases include, but are not limited to, oxygen, nitrogen, hydrogen sulfide, carbon dioxide, sulfur dioxide, and chlorine.

Gas hydrate crystals or gas hydrates are a class of clathrate hydrates of particular interest to the petroleum industry because of the pipeline blockages that they can produce during the production and/or transport of the natural gas and other petroleum fluids. For example, at a pressure of about 1MPa ethane can form gas hydrates at temperatures below 4° C., and at a pressure of 3MPa ethane can form gas hydrates at temperatures below 14° C. Such temperatures and pressures are not uncommon for many operating environments where o natural gas and other petroleum fluids are produced and transported.

As gas hydrates agglomerate they can produce hydrate blockages in the pipe or conduit used to produce and/or transport natural gas or other petroleum fluid. The formation of such hydrate blockages can lead to a shutdown in production and thus substantial financial losses. Furthermore, restarting a shutdown facility, particularly an offshore production or transport facility, can be difficult because significant amounts of time, energy, and materials, as well as various engineering adjustments, are often required to safely remove the hydrate blockage.

A variety of measures have been used by the oil and gas industry to prevent the formation of hydrate blockages in oil or gas streams. Such measures include maintaining the temperature and/or pressure outside hydrate formation conditions and introducing an antifreeze such as methanol, ethanol, propanol, or ethylene glycol. From an engineering standpoint, maintaining temperature and/or pressure outside hydrate formation conditions requires design and equipment modifications, such as insulated or jacketed piping. Such modifications are costly to implement and maintain. The amount of antifreeze required to prevent hydrate blockages is typically between 10% to 20% by weight of the water present in the oil or gas stream. Consequently, several thousand gallons per day of such solvents can be required. Such quantities present handling, storage, recovery, and potential toxicity issues to deal with. Moreover, these solvents are difficult to completely recover from the production or transportation stream.

Consequently, there is a need for a gas hydrate inhibitor that can be conveniently mixed at low concentrations in the produced or transported petroleum fluids. Such an inhibitor should reduce the rate of nucleation, growth, and/or agglomeration of gas hydrate crystals in a petroleum fluid stream and thereby inhibit the formation of a hydrate blockage in the pipe conveying the petroleum fluid stream.

One method of practicing the present invention uses gas hydrate inhibitors which can be used in the concentration range of about 0.01% to about by weight of the water present in the oil or gas stream. As discussed more fully below, the inhibitors of this invention can effectively treat a petroleum fluid having a water phase.

SUMMARY OF THE INVENTION

According to the invention there is provided a method for inhibiting the formation of clathrate hydrates in a fluid having hydrate forming constituents. The method comprises treating the fluid with an inhibitor comprising a substantially water soluble polymer produced from a cyclic imino ether.

One embodiment of the invention includes treating the fluid with an inhibitor mixture having (a) an inhibitor comprising a substantially water soluble polymer formed from a cyclic imino ether and (b) a liquid used for introducing the inhibitor into the fluid. Preferably, such liquid is an alcohol, water, brine, or some mixture thereof.

Some inhibitors which can be used to practice the invention include, but are not limited to, substantially water soluble polymers that can be produced from a N-acyl substituted polyalkeneimine selected from the group consisting of N-acyl substituted polyethyleneimine, N-acyl substituted polypropyleneimine, N-acyl substituted polybutyleneimine, N-acyl substituted polypentyleneimine, and copolymers thereof. Furthermore, the N-acyl substituent for such water soluble polymers can be selected from from the group consisting of a hydrogen, alkyl, aryl, alkylaryl, cycloalkyl, and heterocyclic group.

DETAILED DESCRIPTION OF THE INVENTION

INVENTIVE METHOD

The inventive method inhibits the formation of clathrate hydrates in a fluid having hydrate forming constituents. Formation of clathrate hydrates means the nucleation, growth, and/or agglomeration of clathrate hydrates. Such clathrate hydrates may be formed in a fluid whether it is flowing or substantially stationary, but are often most problematic in flowing fluid streams conveyed in a pipe. For example, flow restrictions arising from partial or complete blockages in a fluid stream can arise as clathrate hydrates adhere to and accumulate along the inside wall of the pipe used to convey the fluid. Nonetheless, the invention can be used for inhibiting formation of clathrate hydrates in substantially stationary fluids.

In one embodiment of the invention, a concentrated solution or mixture of one or more of the inhibitors of the type described below is introduced into a petroleum fluid stream having an aqueous phase. As the inhibitor solution or mixture of this invention is substantially dissolved in the aqueous phase or dispersed in the fluid stream it reduces the rate that clathrate hydrates are formed, and thereby reduces the tendency for a flow restriction to occur.

In a preferred embodiment, the solid polymer is first dissolved into an appropriate carrier solvent or liquid to make a concentrated solution or mixture. It should be understood that many liquids may effectively facilitate treatment of the fluid stream without dissolving the inhibitor. Many liquids, however, will preferably dissolve the inhibitor and, for convenience, are referred to hereafter as solvents whether they produce an inhibitor solution, emulsion, or other type of mixture. The solvent's principal purpose is to act as a carrier for the inhibitor and to facilitate the inhibitor's absorption into the aqueous phase of the petroleum fluid. Any solvent suitable for delivering the inhibitor to the fluid's aqueous phase may be used. Such solvents include, but are not limited to, water, brine, sea water, produced water, methanol, ethanol, propanol, isopropanol, or mixtures of such solvents. Other solvents familiar to those skilled in the art may also be used.

It should be understood that the use of a carrier solvent is not required to practice the invention, but it is a convenient method of introducing the inhibitor into the fluid. In many applications the use of a carrier solvent will facilitate treatment of the fluid stream.

Any convenient concentration of inhibitor in the carrier solvent can be used, so long as it results in the desired final concentration in the aqueous phase of the petroleum fluid. Higher concentrations are preferred, since they result in a reduced volume of concentrated solution to handle and introduce into the petroleum fluid. The actual concentration used in a specific application will vary depending upon the selection of carrier solvent, the chemical composition of the inhibitor, the system temperature, and the inhibitor's solubility in the carrier solvent at application conditions.

The inhibitor mixture is introduced into the aqueous phase of the petroleum fluid using mechanical equipment, such as, chemical injection pumps, piping tees, injection fittings, and other devices which will be apparent to those skilled in the art. However, such equipment is not essential to practicing the invention. To ensure an efficient and effective treatment of the petroleum fluid with the inhibitor mixture two points should be considered.

First an aqueous phase is preferably present at the location the inhibitor solution is introduced into the fluid. In some petroleum fluid systems (particularly natural gas systems), an aqueous phase does not appear until the gas has cooled sufficiently for water to condense. If this is the case, the inhibitor solution is preferably introduced after the water has condensed. Alternatively, in the event that an aqueous phase is not available at the point the inhibitor solution is introduced, the inhibitor solution concentration should be selected to ensure that the inhibitor solution's viscosity is sufficiently low to facilitate its dispersion through the fluid and permit it to reach the aqueous phase, Second, because the inhibitor primarily serves to inhibit the formation of clathrate hydrates, rather than reverse such formation, it is important to treat the fluid prior to substantial formation of clathrate hydrates. As a wet petroleum fluid cools it will eventually reach a temperature, known as the hydrate equilibrium dissociation temperature or $T_{eq}$, below which hydrate formation is thermodynamically favored. A petroleum fluid's $T_{eq}$ will shift as the pressure applied to the fluid and the its composition change. Various methods of determining a fluid's $T_{eq}$ at various fluid compositions and pressures are well known to those skilled in the art. Preferably, the fluid should be treated with the inhibitor when the fluid is at a temperature greater than its $T_{eq}$. It is possible, but not preferable, to introduce the inhibitor while the temperature is at or slightly below the fluid's $T_{eq}$, preferably before clathrate hydrates have begun to form.

The quantity of inhibitor introduced into a petroleum fluid with an aqueous phase solvent will typically vary between about 0.01 wt % to about 5 wt % by weight of the water present in the fluid. Preferably, the inhibitor concentration will be about 0.5 wt %. For example, a laboratory study has shown that adding 0.5 wt % of poly(2-ethyl-2-oxazoline) to a petroleum fluid allowed the fluid to cool to a temperature which was about 7° C. below its $T_{eq}$ without formation of a hydrate blockage. A higher inhibitor concentration can be used to lower the temperature at which a hydrate blockage is obtained. A suitable concentration for a particular application, however, can be determined by those skilled in the art by taking into account the inhibitor's performance under such application, the degree of inhibition required for the petroleum fluid, and the inhibitor's cost.

INHIBITOR DESCRIPTION

Compounds belonging to the group of polymers and copolymers of N-acyl substituted polyalkeneimines, and mixtures thereof, are very effective inhibitors of hydrate nucleation, growth, and/or agglomeration (collectively referred to as hydrate formation). This group includes polymers derived from 2-alkyl-2-oxazolines, 2-alkyl-2-oxazines, and other cyclic imino ethers. A generic structure for these polymers is depicted as follows:

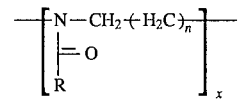

where R is hydrogen or an alkyl, aryl, alkylaryl, cycloalkyl, or heterocyclic group such that the resultant polymer is substantially water soluble, n ranges from one to four and x is an average integer sufficient to produce an average molecular weight between about 1,000 to about 1,000,000.

Regarding a polymer's average molecular weight, it is well understood by those skilled in the art that a given polymer composition is comprised of polymers having variable chain lengths and molecular weights, with some above and some below the polymer's average molecular weight. Therefore, some polymer chains contain less than x repeating units and some polymer chains contain more than x repeating units. Accordingly, x represents an average number of repeating units over the distribution of polymer chains comprising a given polymer composition.

A preferred N-acyl substituted polyalkeneimine is poly(2-ethyl-2oxazoline) (hereinafter referred to as PEOx). For the above structure, n=1, R is an ethyl group, and x=5,050 for PEOx having an average molecular weight of about 500,000.

Copolymers of these cyclic imino ethers (either random or block type AB and ABA copolymers) are also effective inhibitors of hydrate nucleation, growth, and/or agglomeration. An example of a block copolymer of 2-alkyl-2-oxazoline is depicted as follows:

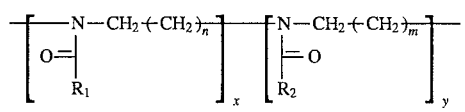

where R is hydrogen or an alkyl, aryl, alkylaryl, cycloalkyl, or heterocyclic group such that the resultant copolymer is substantially water soluble, n=1–4, m= 1–4 and x and y are average integer values sufficient to produce an average molecular weight for the copolymer between about 1,000 and 1,000,000.

Also, the N-acyl substituted polyalkyleneimines can be used in various ratios with either (1) other substantially water soluble homopolymers, including but not limited to, polyvinylpyrrolidone, polyvinylcaprolactam, polyacrylamides, or copolymers thereof or (2) other copolymers formed from such water soluble polymers and substantially water insoluble polymers, including but not limited to, polyvinylcarboxylates and polyacrylates. Generic structures for such homopolymers are shown below:

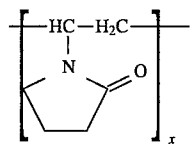

Polyvinylpyrrolidone

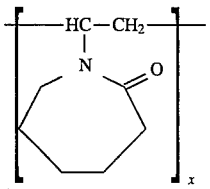

Polyvinylcaprolactam

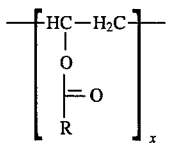

Polyvinylcarboxylate

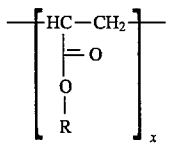

Polyacrylate

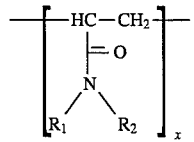

Polyacrylamide where R, $R_1$, or $R_2$ is a hydrogen, alkyl, aryl, alkylaryl, cycloalkyl, or heterocyclic group such that the resultant polymer is substantially water soluble and x=an integer value sufficient to produce an average molecular weight for the polymer between about 1,000 and 1,000,000.

Polyvinylpyrrolidone, polyvinylcaprolactam, polyvinylcarboxylate, polyacrylate, and polyacrylamide, and many of their copolymers are commercially available through Aldrich Chemical Company and other chemical manufacturers. PEOx is also commercially available. Other members of the polyalkeneimine class may be readily synthesized by processes known to those skilled in the art. The description below provides a general synthetic procedure and related experimental examples for demonstrating how other specific members of polyalkeneimine class would be prepared.

INHIBITOR SYNTHESIS
General Procedure

Cyclic imino ethers, molecules which contain the —N=C—O— group in a ring structure, are well known (see for example, Seeliger et al., *Angew. Chem. Int. Ed.*, Vol. 5, No. 10, 875–888 (1966)). They are commonly prepared by cyclization of N-substituted carboxamides or by metal catalyzed cyclization of organic nitriles and amino alcohols (U.S. Pat. No. 3,741,961). In particular, 2-alkyl-2-oxazolines are commonly synthesized by catalytic cyclodehydration of N-(β-hydroxyalkyl) carboxamides (U.S. Pat. No. 4,203,900 and U.S. Pat. No. 4,354,029).

N-acyl substituted polyalkyleneimines are commonly prepared through cationic ring-opening polymerization of cyclic imino ethers ( U.S. Pat. No. 4,584,352 and references therein). The ring-opening polymerization is generally conducted in the presence of a cationic polymerization catalyst at a reaction temperature of 0°–200° C. Typical catalysts include strong mineral acids, Lewis acids such as aluminum trichloride, dialkyl sulfates, methyl tosylate, and other such materials. N-acyl substituted polyalkyleneimines, generally, have molecular weights ranging from about 1,000 to 1,000,000. Preferred molecular weights for the inhibitors of this invention are 20,000 to 500,000. A generic structure for these polymers is shown below, where R is a hydrogen, alkyl, aryl, alkylaryl, cycloalkyl, or heterocyclic group such that the resultant polymer is substantially water soluble, and where n=1–4:

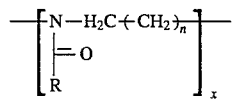

A preferred N-acyl substituted polyalkeneimine is poly(2-ethyl-2-oxazoline) (hereinafter referred to as PEOx).

Cyclic imino ethers can be block copolymerized (Kobayashi, S. et al., Macromolecules, 1986, 19, 535). The block copolymers are produced using the same cationic ring-opening chemistry used for preparation of the homopolymers. The polymerization, however, is done in stages. After polymerization of the first cyclic imino ether monomer is complete, a second cyclic imino ether monomer is added. This results in an AB-type block copolymer. Addition of a second aliquot of the first monomer after the second stage results in an ABA-type block copolymer. These block copolymers may possess both hydrophilic and lipophilic chains in the same molecule depending on the monomers employed. The hydrophilic/lipophilic balance is controlled by the relative proportions of the different monomers. This allows adjustment of the water solubility of the resultant polymer. A representative structure for an AB-type block copolymer of 2-alkyl-2-oxazoline is shown below:

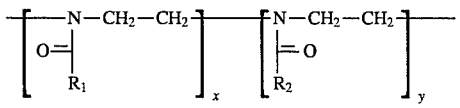

where $R_1$ and $R_2$ is hydrogen or an alkyl, aryl, alkylaryl, cycloalkyl, or heterocyclic group such that the resultant block copolymer is substantially water soluble.

The following examples illustrate how a N-acyl substituted alkeneimine is synthesized. Synthesis of other N-acyl substituted alkeneimines will be apparent to those skilled in the art in light of synthesis procedures described below.
Laboratory Synthesis
Synthesis of 2-Propyl-2-oxazoline A 100 mL flask equipped with reflux condenser was charged with 30.5 g of monoethanolamine and 1.0 g cobalt chloride hexahydrate. The mixture was warmed gently to dissolve the cobalt chloride hexahydrate. 34.5 g n-butyronitrile are added and refluxed gently for about 16 hours. Reflux temperature rises from 120 to 145° C., and ammonia was evolved. The crude mixture was vacuum distilled and the product was collected. The structure of the product, 2-propyl-2-oxazoline, was confirmed by carbon-13 nuclear magnetic resonance (NMR) spectroscopy.

Polymerization of 2-Propyl-2-oxazoline

A 1 L round bottomed flask equipped with reflux condenser, drying tube, stirrer, nitrogen inlet, addition funnel, and thermometer was purged. 500 mL dry acetonitrile was placed in the flask with 1.64 g methyl trifluoromethanesulfonate. 56.5 g 2-propyl-2-oxazoline are added dropwise with stirring at 0° C. After addition was complete, the reaction mixture was heated to 80° C. for 24–48 hours. The reaction mixture was poured into diethyl ether to precipitate the polymer. The polymer was redissolved in acetonitrile and precipitated again with diethyl ether to purify. The structure of the polymer, poly(2-propyl-2-oxazoline), was confirmed by carbon-13 NMR and gel permeation chromatography (GPC).

Preparation of a Block Copolymer of 2-Methyl-2-oxazoline and 2-Propyl-2-oxazoline Employing the procedure described above, 42.5 g 2-methyl-2-oxazoline (commercially available from Aldrich Chemical Company) was polymerized with 1.64 g methyl trifluormethanesulfonate in acetonitrile. After heating for 24 hours, 56.5 g 2-propyl-2-oxazoline was added dropwise to the reaction mixture. Heating was continued for another 24 hours. The reaction mixture was poured into diethyl ether to precipitate the resultant block copolymer which was confirmed using carbon-13 NMR and GPC.

INHIBITOR EVALUATION

Laboratory Evaluation Procedure

One method for evaluating an inhibitor's effectiveness is a bench-scale atmospheric pressure test often referred to as a tetrahydrofuran or THF test. A THF test typically uses 3mL of tetrahydrofuran (THF) and 9 mL of ASTM synthetic seawater (SSW) containing the desired amount of inhibitor additive. The THF and SSW are placed in a capped test tube (15 mm OD×12.5 cm long) with a 0.95 centimeter stainless steel ball. Each tube is placed in a ferriswheel-type holder and placed in a cooling bath held near 0° C. The tubes are rotated to facilitate mixing of the samples. The tubes are monitored visually and recorded with a video camera. As hydrate formation proceeds the viscosity of THF/SSW solution increases. In many instances the solution's viscosity will become high enough for the ball to stop moving. The time required for the stainless steel ball to stop moving the full length of the tube is referred to as ball stop time or BST.

The BST is an approximate indication of an inhibitor's effectiveness. Because the THF/SSW solution has a $T_{eq}$ of about 2°–5° C. and THF is miscible with water, hydrate formation is substantially accelerated for the THF/SSW solution as compared to petroleum fluids conveyed in a pipeline or flowline under typical field conditions. Therefore, BSTs are useful for indicating which inhibitors may be effective under field applications. A BST for a THF/SSW solution with an inhibitor which is about three times the BST for a THF/SSW control solution with no inhibitor present indicates that the inhibitor demonstrates a threshold inhibition effect. Therefore, as used herein, a threshold inhibition concentration ("TIC") means the inhibitor concentration in a THF/SSW solution required to produce a BST which is about three times the BST for a THF/SSW control solution. Because the THF test results are sensitive to variations in the temperature at which the test is run, rotation frequency of the tube, clearances between the stainless steel ball and tube wall, etc., it is important to run a THF/SSW control solution with each inhibitor evaluation to ensure that an inhibitor's TIC is accurately measured and that a reliable threshold inhibition effect is observed.

THF Test Results of Poly(2-ethyl 2-oxazoline)

Three molecular weight ranges of polymers of 2-ethyl-2-oxazoline or PEOx (commercially available from Aldrich Chemical Company), 50,000, 200,000 and 500,000, were evaluated at a 0.5 wt % concentration. The 500,000 molecular weight was also evaluated at 0.2 wt %. SSW without an inhibitor added was evaluated as a control.

TABLE 1

| THF TEST RESULTS WITH PEOX | | | |
|---|---|---|---|
| ADDITIVE | CONC, WT % | MOL WT | BALLSTOP TIME (min) |
| NONE | — | — | 6.2 |
| PEOx | 0.5 | 50,000 | 42 |
| PEOx | 0.5 | 200,000 | 58.5 |
| PEOx | 0.2 | 500,000 | 43.5 |
| PEOx | 0.5 | 500,000 | 93 |

These results show the effects of molecular weight and inhibitor concentration on the PEOx's ability to inhibit hydrate formation. Generally, for a PEOx concentration of 0.5 wt %, an increase in PEOx's molecular weight from 50,000 to 200,000 to 500,000 enhanced its ability to inhibit hydrate formation, although this correlation does not appear to be linear. Also, for PEOx having the same molecular weight (i.e., 500,000), but added at different concentrations, 0.2 and 0.5 wt %, a positive linear correlation was observed between such concentrations and the inhibitor's effectiveness. These THF testing results demonstrate that even under ideal hydrate formation conditions, PEOx substantially inhibits hydrate formation, and thereby reduces the time needed to form such hydrates.

The means and method for practicing the invention and the best mode contemplated for practicing the invention have been described. It is to be understood that the foregoing is illustrative only and that other means and techniques can be employed without departing from the true scope of the invention defined in the following claims.

We claim:

1. A method for inhibiting the formation of clathrate hydrates in a fluid having hydrate forming constituents, said method comprising treating said fluid with an inhibitor comprising a substantially water soluble polymer produced from a cyclic imino ether.

2. The method of claim 1 wherein said cyclic imino ether produces a N-acyl substituted polyalkeneimine selected from the group consisting of N-acyl substituted polyethyleneimine, N-acyl substituted polypropyleneimine, N-acyl substituted polybutyleneimine, N-acyl substituted polypentyleneimine, and copolymers thereof.

3. The method of claim 2 wherein said N-acyl substituent is selected from the group consisting of a hydrogen, alkyl, aryl, alkylaryl, cycloalkyl, and heterocyclic group.

4. The method of claim 1 wherein said inhibitor further comprises a substantially water soluble polymer selected from the group consisting of homopolymers of polyacrylamide, polyvinylpyrrolidone, polyvinylcaprolactam, copolymers thereof and copolymers formed from said homopolymers and substantially water insoluble polymers selected from the group consisting of polyvinylcarboxylate and polyacrylate.

5. A method for inhibiting the formation of clathrate hydrates in a fluid having hydrate forming constituents, said method comprising:
   treating said fluid with an inhibitor mixture having,
      a) an inhibitor comprising a substantially water soluble polymer formed from a cyclic imino ether, and
      b) a liquid used for used for introducing said inhibitor into said fluid.

6. The method of claim 5 wherein said cyclic imino ether forms a N-acyl substituted polyalkeneimine selected from the group consisting of N-acyl substituted polyethyleneimine, N-acyl substituted polypropyleneimine, N-acyl substituted polybutyleneimine, N-acyl substituted polypentyleneimine and copolymers thereof.

7. The method of claim 6 wherein said N-acyl substituent is selected from the group consisting of a hydrogen, alkyl, aryl, alkylaryl, cycloalkyl, and heterocyclic group.

8. The method of claim 5 wherein said inhibitor mixture further comprises a substantially water soluble polymer selected from the group consisting of homopolymers of polyacrylamide, polyvinylpyrrolidone, polyvinylcaprolactam, copolymers thereof, and copolymers formed from said homopolymers and substantially water insoluble polymers selected from the group consisting of polyvinylcarboxylate and polyacrylate.

9. The method of claim 5 wherein said liquid is selected from the group consisting of an alcohol, water, and brine.

10. A method for inhibiting the formation of clathrate hydrates in a pipe containing a petroleum fluid stream having hydrate forming constituents, said method comprising:
   a) producing an inhibitor mixture having,
      1) an inhibitor comprising a substantially water soluble polymer formed from a cyclic imino ether, and
      2) a liquid used for used for introducing said inhibitor into said fluid; and
   b) introducing said inhibitor mixture into said petroleum fluid stream, thereby inhibiting the formation of a hydrate restriction in said pipe.

* * * * *